United States Patent [19]

Adkins et al.

[11] 4,019,200
[45] Apr. 19, 1977

[54] MONOLITHIC SURFACE ACOUSTIC WAVE SIGNAL STORAGE DEVICE

[75] Inventors: Larry R. Adkins, Tustin; James L. Gates, Costa Mesa, both of Calif.

[73] Assignee: Rockwell International Corporation, El Segundo, Calif.

[22] Filed: June 11, 1975

[21] Appl. No.: 586,107

[52] U.S. Cl. .................. 357/26; 340/173 R; 358/201; 357/24; 357/54
[51] Int. Cl.² .................. H01L 29/84; H01L 29/96; H01L 29/78; H04N 3/00
[58] Field of Search .................. 357/26, 54, 24; 340/173; 178/7.1, 7.6

[56] References Cited

UNITED STATES PATENTS

| | | | |
|---|---|---|---|
| 3,479,572 | 11/1969 | Pokorny | 357/26 |
| 3,675,140 | 7/1972 | Fang et al. | 357/26 |
| 3,749,984 | 7/1973 | Benyon et al. | 357/26 |
| 3,816,753 | 6/1974 | Kano | 340/173 |
| 3,851,280 | 11/1974 | Staples | 357/26 |
| 3,877,982 | 4/1975 | Coldron et al. | 357/26 |
| 3,886,503 | 5/1975 | Bert et al. | 340/173 R |
| 3,935,564 | 1/1976 | Quate et al. | 357/26 |

OTHER PUBLICATIONS

*Effect of Bias Field in Zinc Oxide On Silicon Acoustic Convolver,* by Coldren, Applied Physics Letters, vol. 25, No. 9, Nov. 1974, pp. 473-475.

Primary Examiner—Andrew J. James
Attorney, Agent, or Firm—H. Frederick Hamann; G. Donald Weber, Jr.; Robert Ochis

[57] ABSTRACT

Monolithic acoustoelectric signal storage device and means for generating a surface acoustic wave on piezoelectric material and propagating the wave into a storage region of the device. An electric field applied across a storage structure in the storage region of the device interacts with the electric field associated with the surface acoustic wave to produce a holographic replica of the wave in a spatially varying distribution of charge trapped at a solid dielectric-dielectric interface. The stored waveform may then be read out at a later time or, in nonlinear signal processing applications, the electric field of a subsequently generated surface acoustic wave may be propagated into the storage region to interact with the trapped charge to produce an output signal.

10 Claims, 4 Drawing Figures

MONOLITHIC SURFACE ACOUSTIC WAVE SIGNAL STORAGE DEVICE

The invention herein described was made in the course of or under a contract or subcontract thereunder with the United States Air Force.

BACKGROUND OF THE INVENTION

1. Field of the Invention

The present invention relates generally to acoustoelectric signal processing devices and, more particularly, to a new and improved monolithic acoustoelectric device having a holographic signal waveform storage capability. The device is useful for storage alone and/or for such signal processing applications as convolution, correlation and the like of relatively high frequency signals.

2. Description of the Prior Art

Considerable effort has been expended in recent years to utilize the unique properties of acoustic wave devices in the signal processing sections of apparatus for radar, communication systems and the like. This is due to their properties of relatively small size, simple fabrication techniques, high reliability and satisfactory electrical performance when compared with alternate devices. Some surface acoustic wave devices, and applications therefor, are reviewed generally in an article by Gordon S. Kino and John Shaw in the October 1972 issue of *Scientific American*, pages 51–68, entitled "Acoustic Surface Waves". This Kino and Shaw article is hereby incorporated by reference into this specification for its discussion of surface acoustic wave phenomena generally, for its discussion of various prior art surface acoustic wave device configurations, and for its discussion of some signal processing applications of such devices.

Among the signal-processing functions which may be accomplished using surface acoustic wave devices, as discussed by Kino and Shaw, are the detection of biphase coded radio frequency (rf) signal pulses, pulse compression of chirped rf signals, signal storage by extended delay, convolution, and correlation including autocorrelation and cross-correlation.

The usefulness of acoustoelectric devices for accomplishing the above-mentioned signal processing functions and others for various applications can be extended by an acoustic wave device having memory, i.e., a capability incorporated therein for storing for a substantial period of time a replica of a signal waveform. In such a device, after such storage is accomplished, the stored signal may then be read out or an output signal may be generated which is the result of the interaction of a spatial distribution of trapped charge conforming to the stored waveform with the electric field associated with a subsequently generated surface acoustic wave.

A surface acoustic wave device having storage capabilities, as discussed above, and various ways of operating it are described in the following three recently published papers, each one of which is hereby incorporated by reference into this specification: (1) J. H. Cafarella, A. Bers and E. Stern, "Surface Acoustoelectric Correlator with Surface State Memory", 1974 *Ultrasonics Symposium Proceedings*, IEEE Cat. No. 74 CHO 896-1SU, pages 216–219; (2) Abraham Bers and J. H. Cafarella, "Surface Wave Correlator-Convolver with Memory", 1974 *Ultrasonics Symposium Proceedings*, IEEE Cat. No. 74 CHO 896-1SU, pages 778–787; and (3) H. Hayakawa and D. S. Kino, "Storage of Acoustic Signal in Surface States in Silicon", *Applied Physics Letters*, Vol. 25, No. 4, Aug. 15, 1974, pages 178–180.

The device described in each of the three publications referenced immediately above comprises a substrate of piezoelectric material capable of supporting and propagating surface acoustic waves. Standard interdigital transducers capable of exciting (and receiving) surface acoustic waves are disposed on the upper or inner surface of the substrate at the opposite ends of a longitudinal surface wave propagation path thereon. A semiconductor wafer of silicon is positioned adjacent the propagation path on the inner surface of the substrate intermediate the interdigital transducers. The semiconductor wafer is spaced apart from the substrate to avoid interfering with surface waves thereon. This spacing introduces an air gap between the lower or inner surface of the wafer and the inner surface of the substrate. A first metal electrode is disposed on the lower or outer surface of the substrate. A second metal electrode is disposed on the upper or outer surface of the silicon wafer. The first and second electrodes provide means for connection to external circuitry for effecting the storage or read-out of signals. In this device, a holographic replica of the waveform of a signal transduced into a surface acoustic wave is stored as a spatially varying distribution of charge trapped in surface states of the semiconductor wafer.

While some success in signal processing has been achieved with the above-described acoustoelectric storage device, a configuration which requires a semiconductor wafer to be precisely spaced across an air gap from a piezoelectric substrate is difficult and expensive to manufacture in quantity to the tolerances required for consistent results. In addition, the retention times for storing signals by semiconductor surface state free-carrier trapping is inherently relatively short.

SUMMARY OF THE INVENTION

This invention provides an acoustoelectric device useful for signal storage and signal processing. The device has a monolithic structure and is capable of holographic storage of a replica of a signal waveform in a spatial distribution of charge trapped at or near an interface of two different solid dielectric materials. According to the present invention, there is provided a device having a multilayered storage structure comprising a layer of a semiconductor material, a layer of a first dielectric material disposed on the semiconductor material, and a layer of a second dielectric material disposed on the first dielectric material. Electrode means are provided for applying and sensing voltages across the storage structure. One form of such a storage structure has been termed an MNOS capacitor. In the subject invention, the second dielectric material has single-crystal piezoelectric properties and is capable of supporting surface acoustic waves. The layer of the second dielectric material extends beyond the limits of the storage region defined by the multilayered storage structure. A transducer arranged to excite surface acoustic waves along a propagation path extending into the storage structure is provided outside the storage region.

DESCRIPTION OF THE PREFERRED EMBODIMENTS

Figure 1:
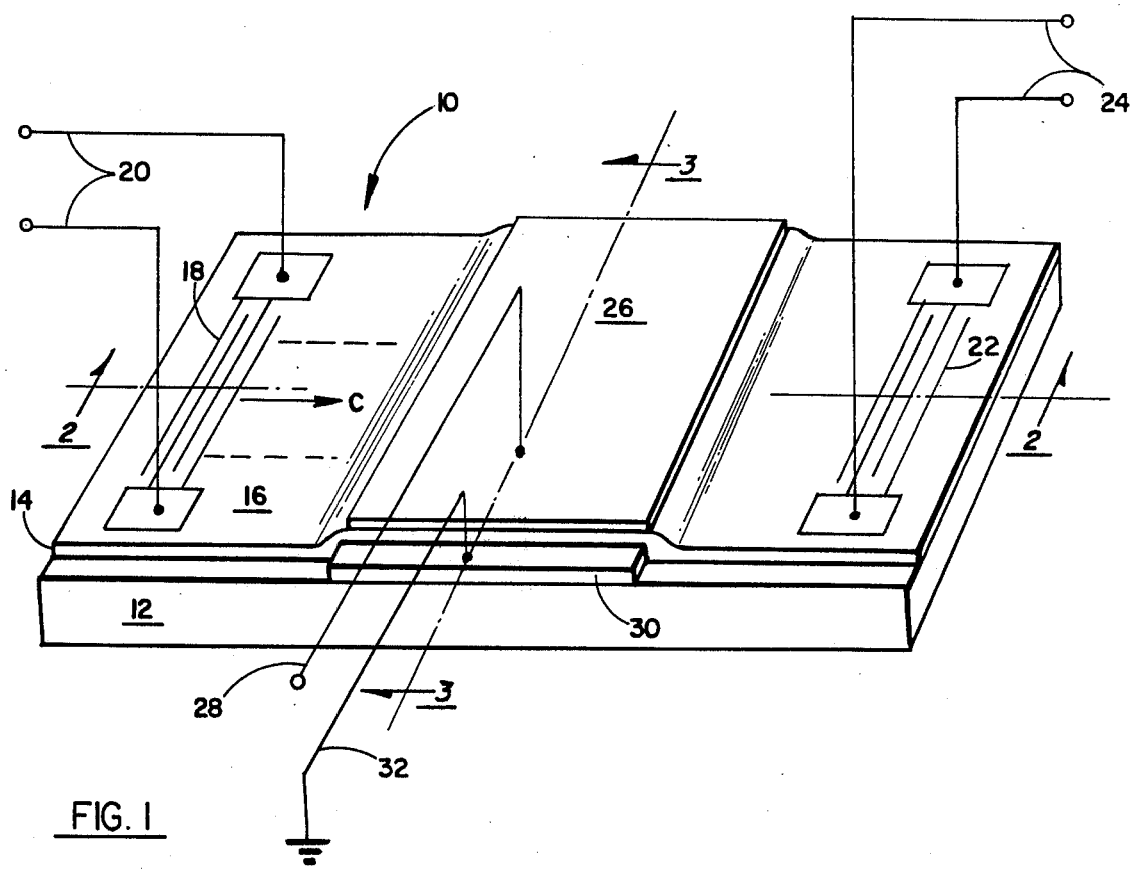
FIG. 1 is a diagrammatic perspective view of the external features of a preferred embodiment of the invention.

In this detailed description, which is to be considered in conjunction with the accompanying drawings, like reference numerals designate like parts throughout.

Referring to FIG. 1, the acoustoelectric device 10 of the subject invention includes a substrate 12 supporting a film 14 of a dielectric material having piezoelectric characteristics and properties. The combination of the piezoelectric film 14 on the substrate 12 is capable of supporting and propagating surface acoustic waves of the Rayleigh type on the upper surface 16 of the film 14. The substrate 12 is preferably cut from a single crystal of sapphire ($Al_2O_3$) along an R-plane of the crystal. For example, that surface of the sapphire substrate 12 on which the piezoelectric film 14 is disposed may be identified by the Miller indices ($01\bar{1}2$).

The film 14 of piezoelectric material is preferably of aluminum nitride having ($11\bar{2}0$) coherent orientation epitaxially grown on the sapphire substrate 12 using the chemical vapor deposition technique of decomposing trimethyl aluminum in the presence of ammonia at a temperature of approximately 1200° C. For the preferred embodiment of the subject invention, the preferred thickness of the aluminum nitride film 14 is 2 microns. As alternatives to sapphire, beryllium oxide or bismuth germanium oxide may be used for the substrate 12. As alternatives to aluminum nitride, barium titanate, zinc oxide, or gallium nitride may be used for the piezoelectric film 14. However, dielectric films of aluminum nitride are well suited for high frequency acoustoelectric device applications. When grown on R-plane sapphire, aluminum nitride exhibits a high velocity of propagation, i.e., approximately $6 \times 10^5$ cm/sec. The high propagation velocity in turn implies that for a given frequency of device operation the fabrication requirements of surface acoustic wave transducers are eased in terms of optical resolution. An additional advantage of aluminum nitride is that it shares the same sapphire growth plane as silicon. This feature allows the monolithic integration of acoustic and semiconductor devices with films having single crystal properties on stable single crystal substrates.

While it is generally accepted that surface acoustic wave devices can be built to operate at a selected mid-band frequency in the range from 50 MHz to 1 GHz, a more practical range of mid-band frequencies is 100 to MHz to 500 MHz. At lower frequencies, certain dimensions of the devices tend to become inconveniently large. For example, to avoid the occurrences of plate modes, the substrate 12 should be on the order of 10 acoustic wavelengths thick. Plate modes occur when the launching of surface acoustic waves on one surface excites similar waves on the opposite surface. A preferred thickness for the sapphire substrate 12 is approximately 20 mils. This is approximately 10 acoustic wavelengths at 100 MHz. At the higher frequencies, propagation losses tend to become excessive. Of course, these parameters are illustrative only and are not to be considered limitative. Also, conventional methods of photolithographic processing approach diffraction limitations in the fabrication of surface acoustic wave transducers for operation at the higher frequencies. Future developments in electron-beam lithography may make this limitation less of a problem. Another factor to consider in selecting an operating frequency is the efficiency of conversion of electrical energy to acoustical energy. For aluminum nitride on sapphire, this efficiency is proportional to the ratio of the thickness of the film 14 to the acoustic wavelength. Since the preferred film thickness has been selected hereinabove at two microns, the remaining option is to select an operating mid-band frequency nearer the higher end of the practical frequency range, e.g., 400 MHz.

A standard interdigital transducer 18 is shown in FIG. 1 disposed on the upper surface 16 of the aluminum nitride film 14 adjacent an end thereof. The transducer 18 is provided with a pair of connecting leads 20. The transducer 18, when electrically energized from an external source (not shown) through connecting leads 20, excites a Rayleigh surface acoustic wave which propagates longitudinally along the surface 16 in the direction indicated by the arrow C. The arrow C also indicates a direction of coherent orientation of the C axes of the crystallites of the aluminum nitride film 14. For some applications of the acoustoelectric device 10, a single interdigital transducer may be sufficient as will be discussed more fully hereinafter in connection with the disucssion of FIG. 2. However, for other applications, it may be desirable to have a second interdigital surface acoustic wave transducer 22 disposed on the surface 16 adjacent the end of the film 14 opposite the end where the transducer 18 is disposed. The transducer 22 is provided with a pair of connecting leads 24 for the input or output of electrical signals from a suitable source (not shown) or to a suitable utilization device (not shown).

In accordance with the present invention, an upper electrode 26 covering the region occupied by a storage structure is disposed on the upper surface 16 of film 14. A lower electrode 30 of low resistivity semiconductor material is disposed on the upper surface of substrate 12 below film 14. A portion of lower electrode 30 extends from beneath the film 14. The electrodes 26 and 30 are positioned opposite each other in the storage structure as will be seen more clearly in FIGS. 2 and 3. A connecting lead 32 couples the lower electrode 30 to a source of reference potential, here shown as ground. The upper electrode 26 is connected to lead 28 for the input of signals to and the output of signals from the electrode 26.

Electrode 26 is preferably formed by the evaporation of a suitable metal onto the upper surface 16 of the film 14. Surface acoustic waves propagating along the surface 16 of the film 14 will necessarily excite wave motion in the electrode 26 as well. The metal used for electrode 26 is therefore preferably aluminum, for its light weight, having a thickness on the order of only 800 to 1000 angstroms for minimum mass loading of the acoustic wave. In the region under the plate 26, the transverse component of the electric field associated with a surface acoustic wave on film 14 will not be affected. However, the tangential component of the electric field associated with a surface acoustic wave will be nullified by currents induced in the electrode plate 26.

Figure 2:
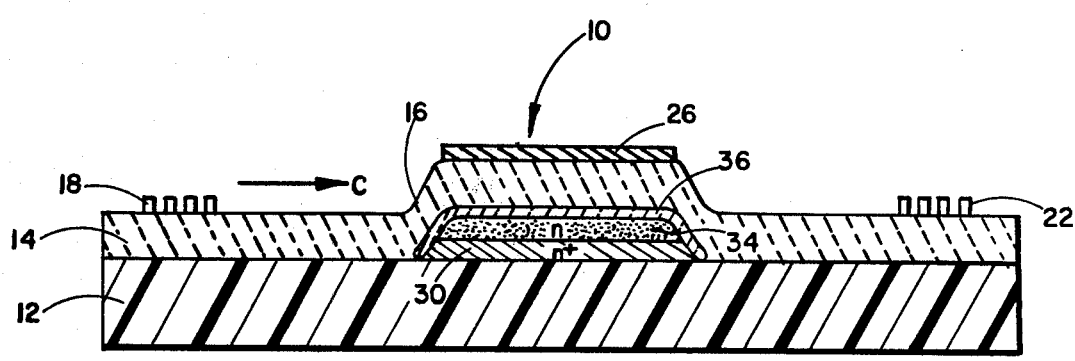
FIG. 2 is an elevation view of a longitudinal cross-section of the acoustoelectric device of FIG. 1 showing details of the storage structure therein.

Referring now to FIG. 2, the internal configuration of the acoustoelectric device 10 of the subject invention is shown in cross-section along a longitudinal plane normal to the surface 16 as indicated by the arrows 2—2 of FIG. 1. More particularly, FIG. 2 reveals a multilayered storage structure comprising, from top to bottom, the metal electrode 26, the film 14 of piezoelectric dielectric material such as aluminum nitride, a layer 36 of a different dielectric material such as silicon dioxide, and a layer of semiconductor material, such as n-type silicon, having an upper region 34 of relatively high resistivity and a lower region 30 (designated $n^+$) of relatively low resistivity. The lower region 30 of relatively low resistivity semiconductor material, e.g., $n^+$-type silicon, serves as the second electrode for the storage structure. The characteristics of a multilayered storage structure such as the one described herein are discussed by K. Ingemar Lundstrom and Christopher M. Svennson in "Properties of MNOS Structures", *IEEE Transactions on Electron Devices*, June 1972, pages 826–836. This Lundstrom-Svennson article is hereby incorporated by reference into this specification for its discussion of the manner in which charge storage is effectuated at a dielectric-dielectric interface. The multilayered storage structure is disposed on a portion of the substrate 12 intermediate the interdigital transducers 18 and 22. The space occupied by the storage structure defines a storage region of limited length extending between and including the electrodes 26 and 30.

In fabricating the acoustoelectric device 10, the layer of semiconductor material having the regions 30 and 34 is necessarily the first layer deposited in the storage region extending upward from the substrate 12. Where the semiconductor material used is silicon, it is preferably deposited on a sapphire substrate 12 by epitaxial growth using prior art techniques well known to those skilled in the art. In addition, for the configuration of the acoustoelectric device 10 shown in FIG. 2, relative ease of high quality state-of-the-art fabrication requires that the thickness for the layer of silicon, including both regions 30 and 34 thereof, is in the range from 2 to 3 microns. In order for the silicon region 30 to serve as an electrode in ohmic contact with the silicon region 34, the silicon region 30 preferably is doped to have a carrier concentration on the order of at least two orders of magnitude greater than that of the silicon region 34. In addition, the silicon region 30 is preferably no thicker than approximately one-third the thickness of the entire layer of silicon.

After fabricating the silicon layer, standard oxidation techniques may be used to form a thin layer of silicon dioxide 36 covering the layer of silicon. The thinner the oxide layer 36, the lower the excitation voltages will need to be for successful operation of the acoustoelectric device 10. On the other hand, a thicker oxide layer 36 will provide longer retention times for a stored signal waveform. A thickness of silicon dioxide layer 36 in the range of from 25 to 50 angstroms has been determined to provide a suitable compromise.

In the storage region defined by the multilayered storage structure, the film 14 of aluminum nitride is grown on the silicon dioxide layer 36 rather than on the sapphire substrate 12. However, reasonably good single crystal coherent quality of the aluminum nitride film 14 must be maintained in the storage structure in order for the aluminum nitride film 14 to have the necessary piezoelectric characteristics. To minimize any fabrication difficulty which might arise from this requirement, the length of the storage region is made no longer than necessary. Storage is accomplished during the time interval when a pulsed surface acoustic wave launched from, for example, the interdigital transducer 18 is entirely in the storage region under the plate 26 and over the high resistivity region 34 of the layer of silicon covered by the silicon dioxide layer 36. As an example, for one microsecond pulses traveling at the aforementioned velocity of $6 \times 10^5$ cm/sec, the preferred storage region length and, more specifically, the lengths of the silicon region 34 and silicon dioxide layer 36 are on the order of 0.6 cm.

Storage may be accomplished in the acoustoelectric device 10 of the subject invention in the following manner. An rf pulse, modulated or coded to carry information supplied from an external source (not shown) to the terminal pair 20, is transduced into a surface acoustic wave by the interdigital transducer 18. The acoustic wave propagates along the surface 16 of the aluminum nitride film 14 into the storage region between the electrodes 26 and 30. At that instant when the traveling surface acoustic wave is completely in the storage region, i.e., under the electrode 26, a positive d.c. bias pulse is applied to the terminal 28 from an external source (not shown). The duration of the d.c. bias pulse is preferably about an order of magnitude less than the period of the rf carrier of the surface acoustic wave. For example, given a 400 MHz carrier frequency, the duration of the d.c. bias pulse applied to the electrode 26 is 0.25 nanoseconds or less. For a sufficiently large positive bias on the electrode 26, electrons in the n-type silicon region 34 are drawn to the oxide-semiconductor interface and, due to the thin silicon dioxide layer 36, these electrons have a probability to penetrate the oxide layer 36 and some part of the nitride layer 14 by quantum-mechanical tunneling. For large enough electric fields, the electrons are injected directly into the conduction band of the nitride through the oxide. The instantaneous spatial distribution of the transverse electric field associated with the surface acoustic wave in the storage region will interact with the electric field established across the electrodes 26 and 30 by the d.c. bias. This interaction varies the number of electrons so injected at a given point to produce a corresponding spatial distribution of injected electrons in the nitride, the spatial distribution corresponding to the waveform of the surface acoustic wave.

When the d.c. bias pulse is removed, the electrons injected into the nitride are trapped in deep traps in the nitride. The trapped electrons will tend to remain in the traps for a long time. The stored waveform may be erased from the traps, or memory, by applying a large negative d.c. bias across the electrodes 26 and 30. Some holes from the silicon region 34 will be caused to tunnel through the oxide layer 36 to combine with trapped electrons while, at the same time, some of the trapped electrons will leave the nitride and return to the silicon due to tunneling. These storage and erasure phenomena are more fully explained in the above-mentioned incorporated-by-reference Lundstrom-Svennson publication. The procedure whereby a stored waveform is erased by the application of a negative d.c. bias to the electrodes 26 and 30 will cause surface acoustic waves having the same waveform as that which was originally stored to be relaunched from the stored structure. Surface acoustic waves will be propagated in both directions outward from the storage structure. Therefore, a replica of the originally stored waveform can be detected at the transducer 22 while a time-inverted replica of the originally stored waveform can be detected at the transducer 18. In this mode of operation, the acoustoelectric device 10 is used simply as a storage device.

However, once a first signal waveform is stored in memory as recited above, the acoustoelectric device 10 of the subject invention may be used to provide an output signal at the electrode terminal 28 which is a nonlinear function of two signals by transducing a second pulsed rf signal into a second surface acoustic wave by either interdigital transducer 18 or interdigital transducer 22. Given that the first signal was launched from the transducer 18, the fields of the second surface acoustic wave will interact with the fields due to the trapped charge to produce an output signal at the plate terminal 28 which is the correlation of the first and second signals provided the second signal is launched from the transducer 18 also. If the second surface acoustic wave is launched from the transducer 22, the output signal at plate terminal 28 will be the convolution of the first and second signals.

Figure 3:
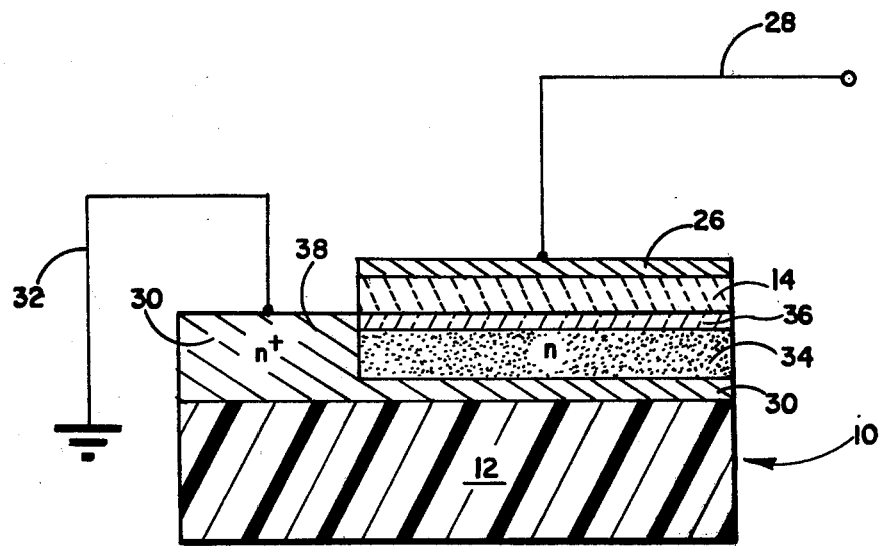
FIG. 3 is an elevation view of a transverse cross-section of the acoustoelectric device of FIG. 1 showing additional details of the storage structure therein.

Referring now to FIG. 3, the internal configuration of the acoustoelectric device 10 of the subject invention is shown in cross-section along a transverse plane normal to the surface 16 as indicated by the arrows 3—3 of FIG. 1. More particularly, FIG. 3 shows a side view of the same multi-layered, thin-oxide MNOS-type storage structure for which a front view is given in FIG. 2. Of particular interest in FIG. 3 is the configuration of the electrode 30 of relatively low resistivity silicon which, in the storage structure under the silicon region 34, is relatively thin, i.e., on the order of a micron or less. However, where the electrode 30 extends outward from the storage structure, shown at the left side of FIG. 3, it is made to be relatively thick and the area of the top surface 38 of the extended portion of the electrode 30 is made to be sufficiently great, e.g., about five mils square, to enable the connecting lead 32 to be attached thereto without damaging the electrod 30 during the attachment process which may be thermocompression bonding.

Figure 4:
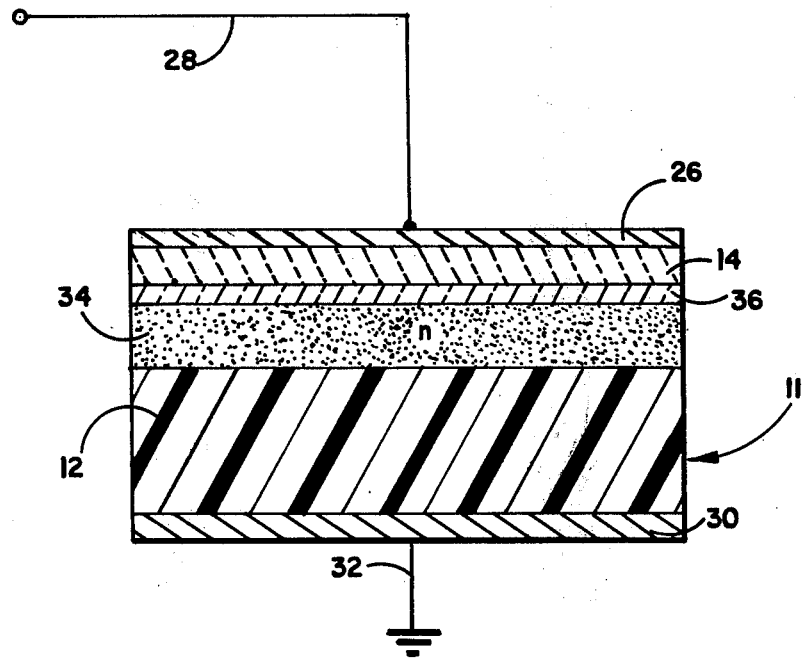
FIG. 4 is an elevation view of a transverse cross-section of a modified form of an acoustoelectric device in accordance with this invention.

In FIG. 4, there is shown an acoustoelectric device 11 in accordance with the subject invention which has a structure modified in one respect from the acoustoelectric device 10 shown in FIGS. 1–3. The view of FIG. 4 is similar to the cross-section end view of the acoustoelectric device 10 of FIG. 3. However, in the acoustoelectric device 11 the second electrode 30 of the storage structure is deposited on the lower surface of the substrate 12. Thus, substrate 12 is interposed in the storage structure between the layer of relatively high resistivity silicon 34 and the second electrode 30. There is no region of relatively low resistivity silicon interposed between the silicon layer 34 and the substrate 12. In this embodiment, the electrode 30 may be of metal, preferably aluminum. The acoustoelectric device 11 of FIG. 4 is relatively less expensive to fabricate since it does not require the more complex processing involved in producing a composite layer of high and low resistivity silicon as in the acoustoelectric device 10 of FIGS. 1–3. However, the operation of the acoustoelectric device 11 does not differ from that which has been set forth hereinabove for the acoustoelectric device 10. Of course, due to the presence of the substrate 12 in the multilayered storage structure, the device may be somewhat less efficient in that higher energy signals and biases may have to be applied for storage and erasure while output signals levels may be lower due to voltage drop across the substrate 12.

It should be noted that the representation of the acoustoelectric devices 10 and 11 of the subject invention as given in FIGS. 1, 2, 3 and 4 is diagrammatic only. The relative dimensions of several features of the invention have been exaggerated and not drawn to scale in order that better understanding of this description may be promoted.

Modifications to the acoustoelectric device of the subject invention can be envisioned and the foregoing description of preferred embodiments of the invention is not to be considered in a limiting sense. The actual scope of the invention is to be indicated only by the appended claims. For example, the various dimensions of the preferred embodiment given above are based on what is believed to be consistent with state of the art fabrication techniques. As these techniques develop, it may be expected that dimensional modifications may be made to suit the needs of a particular application to operate the invention at higher or lower frequencies, with higher or lower voltages, with longer or shorter pulses, or to provide shorter or longer retention times. As another example, well-known techniques for focusing surface acoustic waves employing acoustic wave guides may be used on the surface 16 of the film 14 to concentrate energy of surface acoustic waves into a smaller storage region thereby providing more efficient use of energy. As yet another example, p-type semiconductor material may be used and the d.c. bias pulse polarity reversed to provide trapping of holes rather than electrons in the nitride for waveform storage.

What is claimed is:
1. A monolithic signal storage and processing device comprising:
  a. a storage structure including:
    1. a layer of relatively high resistivity semiconductor material;
    2. a first film of dielectric material disposed on said layer of relatively high resistivity semiconductor material;
    3. a second film of dielectric material having piezoelectric properties disposed on said first film; and
    4. electrode means for applying and sensing voltages across said storage structure;
  b. substrate means for supporting said storage structure, said substrate means having an upper surface, said second film extending further along said substrate upper surface then said layer, said first film and said electrode means and being disposed on said upper surface outside said storage region; and
  c. transducer means disposed on said second film outside said storage region, where said second film is disposed on said upper surface of said substrate means for launching surface acoustic waves along a propagation path from said transducer means into said storage structure.

2. A monolithic signal storage and processing device as recited in claim 1 wherein said substrate is cut from a single crystal of sapphire along an R-plane thereof.

3. A monolithic signal storage and processing device as recited in claim 1 wherein said layer of relatively high resistivity semiconductor material is silicon.

4. A monolithic signal storage and processing device as recited in claim 1 wherein said first film of dielectric material is silicon dioxide.

5. A monolithic signal storage and processing device as recited in claim 1 wherein said second film of dielectric material is a coherently oriented film of aluminum nitride.

6. A monolithic signal storage and processing device as recited in claim 1 wherein said electrode means comprises a first electrode of aluminum disposed on said second film of dielectric material.

7. A monolithic signal storage and processing device as recited in claim 6 wherein said electrode means comprises a second electrode of relatively low resistivity semiconductor material disposed on said substrate upper surface.

8. A monolithic signal storage and processing device as recited in claim 6 wherein said layer of relatively high resistivity semiconductor material is disposed on said substrate upper surface and wherein said electrode means comprises a second electrode of conductor material disposed on a substrate lower surface opposite said layer of high resistivity semiconductor material.

9. A signal processing device as recited in claim 1 wherein said transducer means comprises at least one interdigital surface acoustic wave transducer.

10. A monolithic signal storage and processing device comprising:

monocrystalline insulating substrate means having an upper surface;

an epitaxial monocrystalline layer of relatively high conductivity semiconductor material epitaxially disposed on only a portion of said upper surface of said substrate means;

a monocrystalline layer of relatively high resistivity semiconductor material epitaxially disposed on said layer of relatively high conductivity semiconductor material;

a film of dielectric material disposed on said layer of relatively high resistivity semiconductor material;

a film of piezoelectric material disposed on said film of dielectric material and portions of the upper surface of said substrate means;

electrode means disposed on the upper surface of said piezoelectric film in alignment with said high resistivity semiconductor material for, in conjunction with said high conductivity semiconductor material, applying and sensing voltages therebetween; and transducer means disposed on the upper surface of said piezoelectric film in an area of said piezoelectric film which is disposed on said substrate, said transducer means configured and oriented for launching surface acoustic waves along a propagation path which includes the portion of the piezoelectric material upon which said electrode means is disposed.

* * * * *